March 27, 1962
P. PRINS
3,026,923
WHEEL RIM COMPRISING A DETACHABLE TIRE
BEAD SEAT RING AND LOCKING RING
Filed Oct. 4, 1960
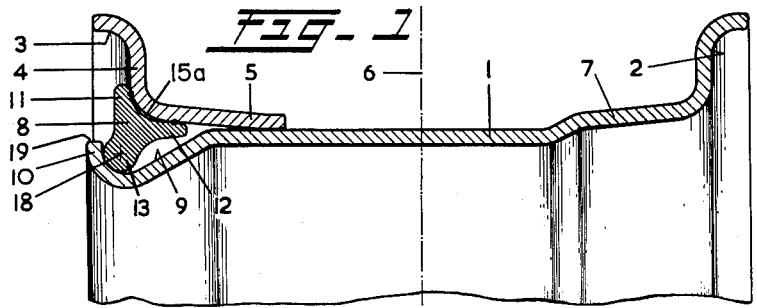
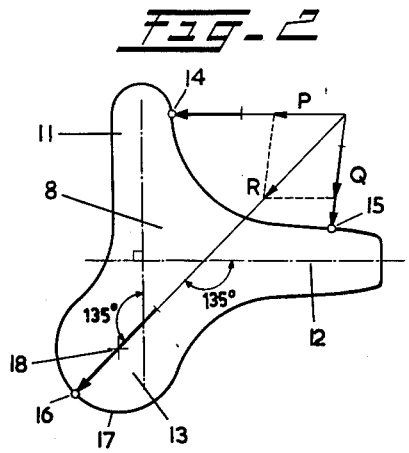
INVENTOR.
Pier Prins
BY *Harry Cole*
His Attorney

3,026,923
WHEEL RIM COMPRISING A DETACHABLE TIRE BEAD SEAT RING AND LOCKING RING

Pier Prins, Dokkum, Netherlands, assignor to Prins N.V., Dokkum, Netherlands, a corporation of the Netherlands
Filed Oct. 4, 1960, Ser. No. 60,404
5 Claims. (Cl. 152—410)

The invention relates to a wheel rim comprising a detachable tire bead seat ring which can be fixed relative to the base of the wheel rim by means of a locking ring. The locking ring has two arms which are adapted to support the flange and the foot of the bead seat ring, respectively, and leave a free interspace between the supporting points and another portion of the ring which extends into a channel of curved cross-sectional configuration formed in the rim base, which base extends beneath said ring.

A wheel rim of this type is known. In this known wheel rim a locking ring is provided whose cross section includes four arms. Two of the arms embrace the edge of the channel and the pressure of the tire is transmitted to said edge via the bead seat ring.

The parts of the rim construction of the above-described type show, generally speaking, relatively large deviations from standard dimensions, since the rim base, as well as the detachable tire bead seat ring and the locking ring are rolled products. It may happen, therefore, that the original contact between the locking ring and the edge of the channel which, as seen in cross section, is a one point contact becomes a contact at two or more points. This hinders the locking ring in tilting to its exact position about the top of the channel edge, for example, when the tire is inflated after mounting.

The object of the invention is to eliminate this drawback. To achieve this object the wheel rim is so constructed according to the invention that the portion of the locking ring which extends into the channel is formed as a third arm supported in the curved portion of the channel and has a radius of curvature smaller than that of the channel in cross section.

In the construction according to the invention there will always be a correct relative adjustment of the locking ring and the parts of the wheel rim.

The invention will now further be described with reference to the accompanying drawing, showing an embodiment of the wheel rim according to the invention. In said drawing:

FIG. 1 represents an axial cross sectional view of part of the wheel rim, and

FIG. 2 is an enlarged view of the locking ring in cross section and the section lines are omitted for the sake of clearness.

The wheel rim comprises a circumferentially continuous rim base 1 with an integral flange 2 and a detachable tire bead seat ring 3. The latter is composed of a flange 4 and a foot 5. The foot 5 is substantially the mirror image of the foot portion 7 of the base relative to the median transverse plane 6.

After the tire (not shown) has been mounted, the detachable bead seat ring 3 is placed axially onto the rim base 1 to the position shown in FIG. 1, whereupon the locking ring 8 (which is split in one place) is laid into the channel 9, which is provided with a gutter 10 along the edge of the rim base which extends adjacent the bead seat ring 3.

In cross section the locking ring 8 has two arms 11 and 12 which bear laterally against the flange 4 of the bead seat ring and against the lower side of the foot 5 of the bead seat ring, respectively, and a third arm 13 which is accommodated in the channel 9. As shown in FIG. 2, the angle between the main axes of the arms 11 and 12 is 90° and each of the angles between the main axes of the arms 11, 13 and 12, 13 is 135°. The points of contact of arm 11 with the flange 4 of the bead seat ring, of arm 12 with the foot 5 of the bead seat ring, and of arm 13 with the gutter 10 are designated by 14, 15 and 16, respectively. The normal forces P and Q, applying at points 14 and 15, respectively, and coming from the pressure exerted on the locking ring 8 by the bead of the tire, form together a resultant R passing exactly through point 16. It is to be noted that a free interspace 15a is provided between points 14 and 15 and the adjacent portions of the locking ring 8 and the bead seat ring 3.

The rounded portion 17 of arm 13 forms an arc substantially equal to a semi circle. In the position according to FIG. 1 the centre 18 of the rounded portion lies at the same position as the centre of the rounded portion of the gutter 10, and consequently beneath the end 19 of said gutter. As indicated previously, the radius of curvature of arm 13 is less than the radius of curvature of channel 9.

I claim:

1. A wheel rim, comprising a circumferentially continuous base having a channel of curved cross section, a detachable tire bead seat ring, and a locking ring for detachably maintaining said bead seat ring in position relative to said base, said locking ring having a pair of spaced parts engaged with corresponding spaced parts on said bead seat ring and having another part only extending into said channel in engagement with one part only on said base, said extending part of said locking ring having a curved cross section which has a radius of curvature which is less than the radius of curvature of said channel.

2. A wheel rim, comprising a circumferentially continuous base, a detachable tire bead seat ring, and a locking ring for detachably maintaining said bead seat ring in position relative said base, said locking ring having a cross section of three extending arms only, two of said arms being in engagement with said bead seat ring at a pair of spaced points only on said bead seat ring, and said remaining arm being in engagement with said base at one point only on said base.

3. A wheel rim, comprising a circumferentially continuous base, a detachable tire bead seat ring, and a locking ring for detachably maintaining said bead seat ring in position relative said base, said locking ring having a cross section of three extending arms only, two of said arms being in engagement with said bead seat ring at a pair of spaced points only on said bead seat ring, and said remaining arm being in engagement with said base at one point only on said base, so that forces are applied to said locking ring at the corresponding engaged points on said arms, said last mentioned points being positioned relative each other so that the resultant of the forces applied to said corresponding pair of spaced points on said locking ring passes through said remaining engaged point on said locking ring corresponding to said point on said base.

4. A wheel rim, comprising a circumferentially continuous base having a channel of curved cross section, a detachable tire bead seat ring, and a locking ring for detachably maintaining said bead seat ring in position relative said base, said locking ring having a cross section of three extending arms only, two of said arms being in engagement with said bead ring at a pair of spaced points only on said bead seat ring, and said remaining arm extending into said channel in engagement with said base at one point only on said base so that forces are applied to said locking ring at the corresponding engaged points on said arms, said last mentioned points being positioned relative each other so that the resultant of the forces applied to said corresponding pair of spaced points on said locking ring, passes through said remaining engaged point on said locking ring corresponding to said point on said base.

5. A wheel rim, comprising a circumferentially continuous base having a channel of curved cross section, a detachable tire bead seat ring, and a locking ring for detachably maintaining said bead seat ring in position relative said base, said locking ring having a cross section of three extending arms only, two of said arms being in engagement with said bead seat ring at a pair of spaced points only on said bead seat ring, and said remaining arm extending into said channel in engagement with said base at one point only on said base so that forces are applied at said locking ring at the corresponding engaged points on said arms, said last mentioned points being positioned relative each other so that the resultant of the forces applied to said corresponding pair of spaced points on said locking ring passes through said remaining engaged point on said locking ring corresponding to said point on said base, said arm extending into said channel having a curved cross section which has a radius of curvature which is less than the radius of curvature of said channel.

References Cited in the file of this patent
UNITED STATES PATENTS

| | | |
|---|---|---|
| 2,884,984 | Riggs | May 5, 1959 |

FOREIGN PATENTS

| | | |
|---|---|---|
| 728,711 | Germany | Dec. 2, 1942 |
| 1,067,000 | France | Jan. 27, 1954 |